United States Patent Office 2,823,482
Patented Feb. 18, 1958

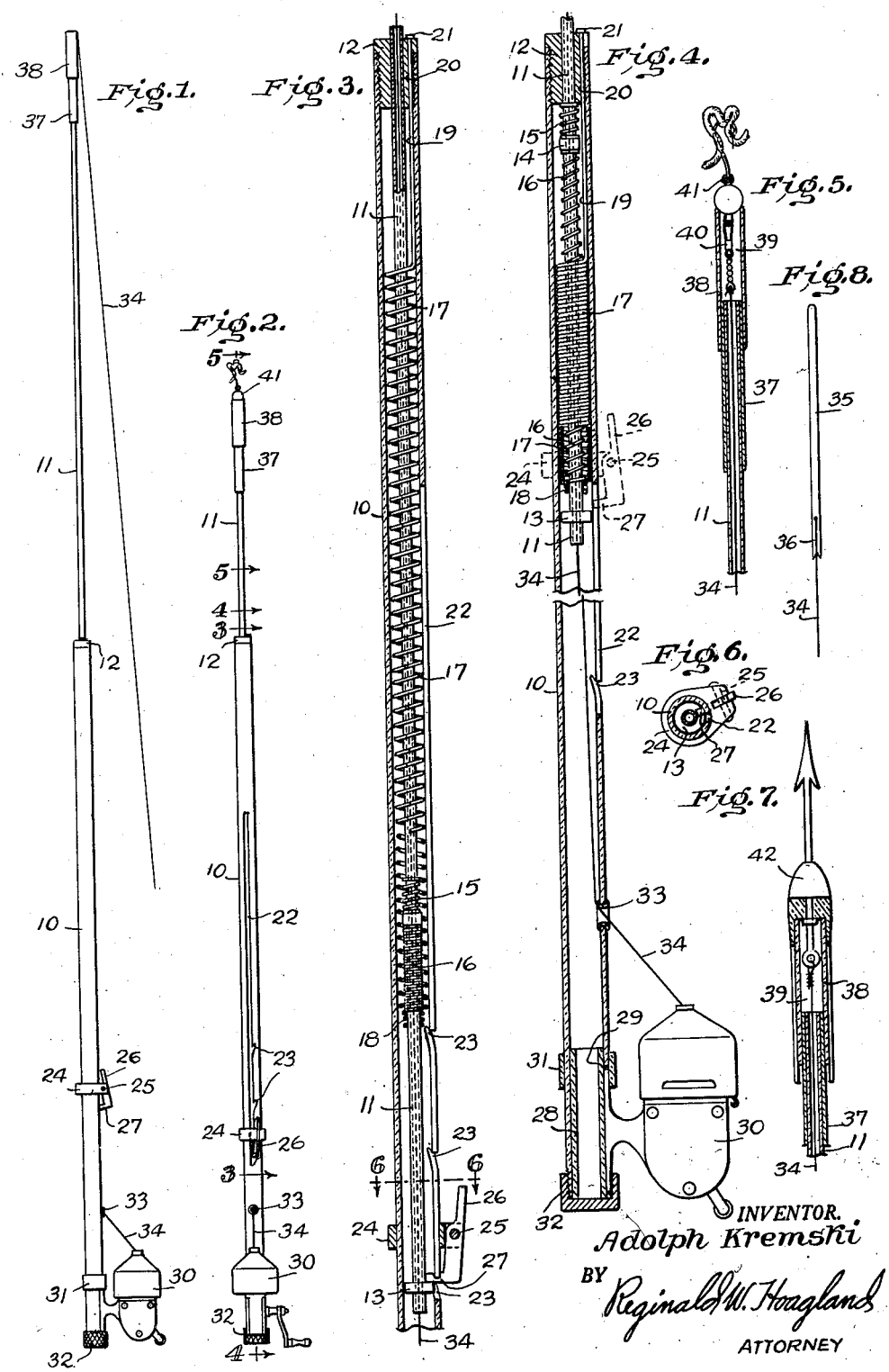

2,823,482

FISHING ROD

Adolph Kremski, Flint, Mich.

Application July 14, 1955, Serial No. 522,071

3 Claims. (Cl. 43—19)

This invention relates to fishing devices, and more particularly, to fishing rods with power means for shooting lures or other lightweight objects with accuracy to desired locations.

When fishing with long and lightweight conventional fishing equipment among bushes and trees or from crowded boats, often there is insufficient room to properly cast the line in the customary manner without physically endangering other parties in the boat, crossing lines, or entangling the line in bushes or overhanging objects.

It is therefore an object of the present invention to provide a gun-type fishing rod that can be pointed in the direction of the location where it is desired to cast a line, and by releasing a source of energy stored within the rod, a lure on the line will be propelled with accuracy to the location selected, thus eliminating swinging motion of the rod and the extending of a length of dangling line beyond the rod in order to cast lightweight lures.

Another object of the invention is to provide, in a device of the character set forth, a hollow rod through which a line extends and slides freely during both the letout of line from a reel and the rewinding of line on the reel, thus dispensing with the use of ring guides for the line.

Another object of the invention is to provide a fishing rod of the above-indicated character which can also be used in the normal conventional manner for casting lures.

A further object of the invention is the provision of a pair of hollow rod sections constructed and arranged in a manner whereby one telescopes within the other and is propelled outwardly of the other by a source of power within one section for shooting a lure or other object tied to a line that extends through both hollow rod sections.

Still another object of the invention is to provide, in a device of the character outlined in the preceding object, a novel spring arrangement for supplying power to actuate one rod section relative to another rod section.

A still further object of the invention is to provide, in a device of the character outlined above, a novel cocking and trigger mechanism for compressing and releasing the spring power.

Still a further object of the invention is to provide, in a device as set forth in the preceding object, a plurality of different cocking positions for the spring-propelled rod section in order that different amounts of energy may be stored for shooting lures different distances.

Still another object of the invention is the provision, in a lure-shooting device of the class above-set forth, of a novel tip structure on the rod section that is propelled outwardly for efficiently transmitting the force of outward motion of said rod section to the lure or similar object.

It is also an object of the invention to provide a device of the above-indicated character, which is simple and substantial in construction, inexpensive to manufacture, and yet highly efficient and practical in use.

These, together with various auxiliary features and objects of the invention which will later become apparent as the following description proceeds, are attained by the present invention, a preferred embodiment of which has been illustrated, by way of example only, in the accompanying drawing, wherein:

Figure 1 is a side elevation of the improved rod in extended position for use as a conventional fishing rod and after a lure has been cast;

Figure 2 is also a side elevation at ninety degrees to that shown in Figure 1, and showing the rod in cocked position with the tip section retracted;

Figure 3 is a fragmentary longitudinal section taken on line 3—3 of Figure 2;

Figure 4 is a similar fragmentary longitudinal section taken on line 4—4 of Figure 2, but showing the parts in extended position as shown in Figure 1;

Figure 5 is also a fragmentary longitudinal section taken on line 5—5 of Figure 2 showing a live bait lure on the tip of the rod;

Figure 6 is a transverse section taken on line 6—6 of Figure 3;

Figure 7 is a sectional view similar to Figure 5, but showing a dart-like missile on the tip of the rod; and Figure 8 is an elevation of a type of needle used to feed a line through the hollow rod sections.

Referring now more specifically to the accompanying drawings wherein like numerals designate similar parts throughout the various views, there is indicated by the numerals 10 and 11 a pair of cylindrical tubular rod sections of hollow fibre glass or other approved material and of different diameters for telescoping a portion of one within the other. The larger or butt section 10 has threaded in its outer or forward end a bushing 12 through which the other or smaller tubular tip section 11 slides. On the inner or rear end of the smaller tubular tip section 11 is rigidly secured a ring 13 that slidably engages the inner surface of the larger tubular butt section 10 and aids the bushing 12 in guiding and maintaining the tip section in direct central alignment with the butt section. Spaced forwardly of the ring 13 and also on the smaller tubular tip section 11 is fixed a collar 14 against which a shock-absorbing coil spring 15 of compression type bears for limiting outward or forward thrust of the tip section by engagement of said spring with the inner end of the bushing 12, as shown in Figure 4 of the drawings.

On the inner or opposite side of the collar 14 and also supported on the smaller tubular tip section 11 is another compression coil spring 16 of considerably greater length than the spring 15 and which, together with a larger diameter contractile coil spring 17 also within the tubular butt section 10 and positioned about the tubular tip section 11, applies an outward force for extending the major portion of the tip section forwardly of the butt section. The contractile coil spring 17 has coils at its inner or rear end reduced in diameter, as at 18, to a size for slidably supporting said spring on the tubular tip section 11, and it is against these coils 18 reduced in diameter that the inner or rear end of the compression spring 16 bears. The opposite or forward end of the contractile coil spring 17 has a straight, forwardly extending, longitudinal extension 19 thereon that is received in a groove 20 in the side of the bushing 12 and is retained therein by a head 21 formed on the extremity of the spring extension 19.

The compression spring 16 is considerably weaker than the contractile spring 17 and is therefore compressed solid during stretching of the spring 17 and withdrawal of the tip section 11, as shown in Figure 3. However, during forward thrust of the tip section and after the contractile spring 17 has contracted solid, the compression spring 16 applies the final forward pressure to move the tip section to the position where it is arrested by the shock-absorbing spring 15. See Figure 4. Thus, it can be seen that the heavier spring 17 is not applying pressure to the tip section 11 during the arresting of forward movement of said tip section.

The cylindrical wall of the larger tubular butt section 10 is slotted longitudinally thereof, as at 22, for a considerable distance intermediate its ends, and one edge of said tubular butt section at a side of the slot has a plurality of spaced notches 23 therein adjacent the rear end of said slot. Exteriorly of and slidable on the tubular butt section 10 is a sleeve 24 which pivotally supports, as at 25, a trigger arm 26. On one end of the trigger arm 26 is an inwardly directed finger 27 which extends through and slides in the slot 23 and which can be engaged with the forward face of the ring 13 and in any one of the notches 23 at the side of the slot 22 to hold the tip section retracted. It can thus be seen that the compression spring 16 and contractile spring 17 force the tip section 11 to its extreme forward position relative to the butt section 10, and that by sliding the sleeve 24 forwardly and engaging the inwardly directed finger 27 on the trigger arm 26 with the ring 13 and pulling the sleeve 24 rearwardly until the inwardly directed finger 27 is engaged in one of the notches 23, the spring 16 will be compressed and the spring 17 stretched for applying a forward force to the tip section 11 of the rod upon release of the inwardly directed finger 27 from engagement with the ring 13.

At the extreme inner end of the tubular butt section 10 there is inserted a relatively short tube 28 which is fixed to its position relative to the butt section 10 and is at a location where the cylindrical wall of the butt section has been cut away, as at 29, to form a seat for the base of a reel 30, which, for the purpose of illustration, is shown as being of the spinning type. Overlapping the forward end of the cutaway portion 29 and secured to the outer surface of the butt section 10 is a band 31 under which one end of the base portion of the reel 30 is inserted, while the opposite end of said base is retained in position by the overlapping of same with a cup-shaped nut 32 threaded exteriorly on the end of the butt section 10. In the cylindrical wall of the butt section 10 between the inner end of the slot 22 and the reel seat, there is an opening into which an eyelet 33 is secured for the extending of a line 34 from the reel 30 into the tubular butt section 10. The line 34 is also threaded through the entire small diameter tubular tip section 11 and has a lure or missile attached thereto forwardly of said tip section. In Figure 8 of the drawings, there is shown a needle 35 having a split end portion 36 thereon into which the end of the line 34 is forced and retained by spring action of said split end for threading the line 34 through the small tubular tip section 11. The weight of the needle is sufficient to pull the line through the tip section upon positioning of the forward end of the tip section downwardly and inserting the needle through the slot 22 and into the inner end of said tip section.

On the forward end or tip of the tip section 11 is a pair of telescoped tubes 37 and 38 that are fixed in their positions relative to one another and relative to the tip section 11 for providing a tubular cavity 39 of increased inside diameter and of a length sufficient to receive a swivel snap fastener 40 tied to the line 34 and attached to a lure 41 that rests against the forward end of the tube 39.

In Figure 7 of the drawings, there is illustrated a dart-like missile 42 to which the line 34 is attached and which is adapted to engage over the cylindrical surface of the tube 38 and abut its end for supporting the missile on and in alignment with the tubular tip section 11.

It can be seen that by engagement of either the lure 41 or the missile 42 with the enlarged end of the tube 38 on the tip section 11 and releasing the pressure applied by the springs 16 and 17, the lure 41 or missile 42 will be forced forwardly, pulling the line 34 from the reel 30 and that when the tubular tip section is arrested by the shock-absorbing spring 15, the lure 41 or the missile 42 will continue to move forward by the momentum gained due to the forward thrust of the tip section 11. By having different notches 23 at the side of the slot 22 for engaging into with the finger 27 of the trigger mechanism, it is possible to store different amounts of spring pressure for propelling either the lure or missile different distances in advance of the rod. Thus, it can be seen that by pointing the rod in the direction in which it is desired to cast a lure or shoot a missile, the lure or missile can be placed at such a location with considerable accuracy upon release of the spring pressure by the trigger mechanism.

In view of the foregoing description taken in conjunction with the accompanying drawings, it is believed that a clear understanding of the construction, manner of use, operation, and advantages of the fishing rod will be quite apparent to those familiar with this art. A more detailed description is accordingly thought unnecessary.

It is to be understood, however, that even though there is herein shown and described a preferred embodiment of the invention, various changes may be made without departing from the spirit and full intendment of the invention.

What is claimed is:

1. A fishing rod comprising a tubular butt section, a tubular tip section of smaller diameter than said butt section telescopically mounted in said butt section for movement to an extended position whereby the major portion of said tip section is outwardly of said butt section or to a retracted position whereby the major portion of said tip section is within said butt section, said tubular butt section and said tubular tip section having the interiors thereof open to one another and being adapted to have a line extending therethrough and freely slidable therein, a ring fixed on the inner end of said tip section and in slidable engagement with the inner surface of said butt section, a bushing on the outer end of said butt section through which said tip section slides, a contractile coil spring within said butt section and about said tip section and having its rear end reduced in diameter and slidable on said tip section, attaching means connecting the forward end of said spring to the forward end of said butt section, a collar fixed to said tip section and disposable within said contractile spring, a compression coil spring within said contractile spring and bearing against one end of said collar and the reduced end of said contractile spring, and a trigger mechanism supported on said butt section for engaging said ring and holding said tip rod section in retracted position against tension of both of said springs.

2. A fishing rod as defined in claim 1 wherein there is provided a shock absorbing spring about said tip section that engages the opposite end of said fixed collar and the bushing on said butt section when said tip section is extended to its forwardmost position.

3. A fishing rod comprising a tubular butt section, a tubular tip section of smaller diameter than said butt section and telescopically mounted in said butt section for movement to an extended position whereby the major portion of said tip section is disposed outwardly of said butt section, or to a retracted position whereby the major portion of said tip section is disposed within said butt section, said tubular butt section and said tubular tip section having the interiors thereof open to one another and being adapted to have a line extending therethrough and freely slidable therein, a ring fixed on said tip section adjacent the inner end thereof and in slidable engagement with the inner surface of said butt section, a bushing on the outer end of said butt section through which said tip section slides, a contractile coil spring within said butt section and disposed about said tip section and having its rear end operatively connected to said tip section, a forward and longitudinally extending straight portion on the forward end of said contractile spring, said bushing having a narrow groove at a side thereof through which said straight portion extends, a head on the free end of said straight portion and forwardly of and engaging said bushing so as to connect the forward end of said contractile spring to the forward end of said butt section, and a trigger mechanism mounted on said butt section for engaging said ring and holding said tip section in retracted position against tension of said spring.

References Cited in the file of this patent

UNITED STATES PATENTS

| | | | |
|---|---|---|---|
| 288,548 | Clark | | Nov. 13, 1883 |
| 1,486,807 | Skala | | Mar. 11, 1924 |
| 2,217,820 | Rowe | | Oct. 15, 1940 |
| 2,225,719 | Shotton | | Dec. 24, 1940 |
| 2,247,561 | Rowe | | July 1, 1941 |

FOREIGN PATENTS

| | | |
|---|---|---|
| 84,236 | Norway | Sept. 13, 1954 |
| 659,718 | Great Britain | Oct. 24, 1951 |
| 814,070 | France | Mar. 8, 1937 |
| 952,900 | France | May 9, 1949 |